(12) United States Patent
Usui

(10) Patent No.: US 7,613,956 B2
(45) Date of Patent: Nov. 3, 2009

(54) MICROCOMPUTER CAPABLE OF MONITORING INTERNAL MEMORY

(75) Inventor: Minoru Usui, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 518 days.

(21) Appl. No.: 11/036,395

(22) Filed: Jan. 18, 2005

(65) Prior Publication Data

US 2005/0223296 A1 Oct. 6, 2005

(30) Foreign Application Priority Data

Mar. 29, 2004 (JP) .............................. 2004-095696

(51) Int. Cl.
*G06F 11/00* (2006.01)
(52) U.S. Cl. .............................. 714/45; 714/37; 714/38
(58) Field of Classification Search .................. 714/37, 714/38, 45
See application file for complete search history.

(56) References Cited

U.S. PATENT DOCUMENTS 5,621,886 A * 4/1997 Alpert et al. .................. 714/38
6,345,295 B1 * 2/2002 Beardsley et al. ............ 709/224
6,467,083 B1 * 10/2002 Yamashita ................... 717/128
2003/0056154 A1 * 3/2003 Edwards et al. ............... 714/45

FOREIGN PATENT DOCUMENTS

JP 2001-101026 4/2001

* cited by examiner

*Primary Examiner*—Emerson C Puente
(74) *Attorney, Agent, or Firm*—Staas & Halsey LLP (57) ABSTRACT

A microcomputer comprises: a CPU which sequentially executes a program; an internal memory connected to the above CPU via an internal bus; a debug support unit, which monitors the internal state in response to an externally provided command; a monitor memory, which stores data stored in the internal memory, for being accessed by the debug support unit; and a monitor memory control unit, connected to the internal bus, which at a concurrent copy mode performs a control to concurrently write, to the monitor memory, data which is written to the internal memory in response to access from the internal bus, and at a monitor mode performs a control to read data in the monitor memory in response to access from the debug support unit.

11 Claims, 6 Drawing Sheets

MICROCOMPUTER CAPABLE OF MONITORING INTERNAL MEMORY

CROSS-REFERENCE TO RELATED APPLICATIONS

This application is based upon and claims the benefit of priority from the prior Japanese Patent Application No. 2004-95696, filed on Mar. 29, 2004, the entire contents of which are incorporated herein by reference.

BACKGROUND OF THE INVENTION

1. Field of the Invention

This invention relates to a microcomputer capable of monitoring internal memory, and in particular relates to a microcomputer capable of monitoring internal memory without halting microcomputer operation.

2. Description of the Related Art

A microcomputer has a CPU, internal memory such as RAM and ROM, peripheral resources having prescribed functions, and other components, connected by an internal bus. The CPU sequentially executes programs in the ROM, and when necessary writes data in the RAM and controls outside devices to be controlled via peripheral resources. As the controlled devices, for example, the combustion in an automobile engine or the vehicle wiper blades may be controlled.

In the stage of development of such a microcomputer, the microcomputer is connected to the controlled device, a program is executed, and an evaluation is performed to determine whether the program can appropriately perform the control as the initially desired function. In this case, in order to halt and restart the program at an arbitrary address of the program, and to monitor data at an arbitrary address of the internal memory, a microcomputer for evaluation, equipped with a debug support unit (DSU), is employed.

It is desirable that a microcomputer for evaluation have various evaluation functions for use in program evaluation and debugging. One of these is a function to access internal memory without halting CPU operation. For example, it has been proposed that, in addition to memory which stores a program to be executed by the CPU for evaluation, memory to store conversion data is provided, conversion data is written to this memory from a control CPU, and the target for access by the CPU is switched from the program memory to the conversion data memory with a certain timing so that the CPU for evaluation is caused to access the conversion data storage memory. Such an emulator is for example described in Japanese Patent Laid-open Publication No. 2001-101026 (Laid-open Publication Date: Apr. 13, 2001).

The emulator described in this Japanese Patent Laid-open Publication No. 2001-101026 is characterized in that a prescribed address in the program memory is switched to the conversion data memory, so that any desired parameters or commands are provided to the CPU, without halting execution of the program of the CPU for evaluation. By this means, desired modifications can be made to the control operation resulting from program execution, and the convenience of debugging or evaluation can be further improved. However, in this Japanese Patent Laid-open Publication No. 2001-101026 there is no description of monitoring of data in internal memory.

In a microcomputer for evaluation equipped with a conventional DSU, the CPU accesses internal memory via an internal bus during program execution, therefore access to the internal memory by the DSU is limited. Hence in order to monitor data in internal memory via a DSU, the DSU supplies a memory access request to the CPU, acquires the bus access rights from the CPU, and accesses the internal memory via the internal bus. Hence in order for the DSU to monitor data in internal memory, the CPU bus access operation must be temporarily halted, and further, in order to acquire bus rights from the CPU, an arbitration procedure extending over a prescribed cycle is necessary; as a consequence, the DSU cannot easily read data from internal memory with arbitrary timing.

SUMMARY OF THE INVENTION

An object of this invention is to provide a microcomputer capable of monitoring data at an arbitrary address in internal memory with arbitrary timing, without halting operation of the CPU.

In order to attain the above object, a first aspect of the invention is a microcomputer comprising: a CPU which sequentially executes a program; an internal memory connected to the above CPU via an internal bus; a debug support unit, which monitors the internal state in response to an externally provided command; a monitor memory, which stores data stored in the internal memory, for being accessed by the debug support unit; and a monitor memory control unit, connected to the internal bus, which at a concurrent copy mode performs a control to concurrently write, to the monitor memory, data which is written to the internal memory in response to access from the internal bus, and at a monitor mode performs a control to read data in the monitor memory in response to access from the debug support unit.

In order to attain the above object, a second aspect of the invention is a microcomputer comprising: a CPU which sequentially executes a program;

an internal memory connected to the CPU via an internal bus; a debug support unit, which monitors an internal state in response to a command from outside; a monitor memory, which stores data stored in the internal memory, for being accessed by the debug support unit; and a monitor memory control unit, connected to the above internal bus, which at a concurrent copy mode performs a control to concurrently write, to the above monitor memory, data which is written to the internal memory in response to access from the internal bus, and at a monitor mode performs a control to forbid access from the internal bus and to read data in the monitor memory in response to access from the debug support unit, wherein data read from the monitor memory at the monitor mode is output to an external device via the debug support unit.

By means of the above aspects of the invention, data in internal memory can be monitored without halting operation of the CPU.

DESCRIPTION OF THE PREFERRED EMBODIMENTS

Below, aspects of the invention are explained referring to the drawings. However, the technical scope of the invention is not limited to these aspects, but extends to the inventions described in the scope of claims and inventions equivalent thereto.

Figure 1:
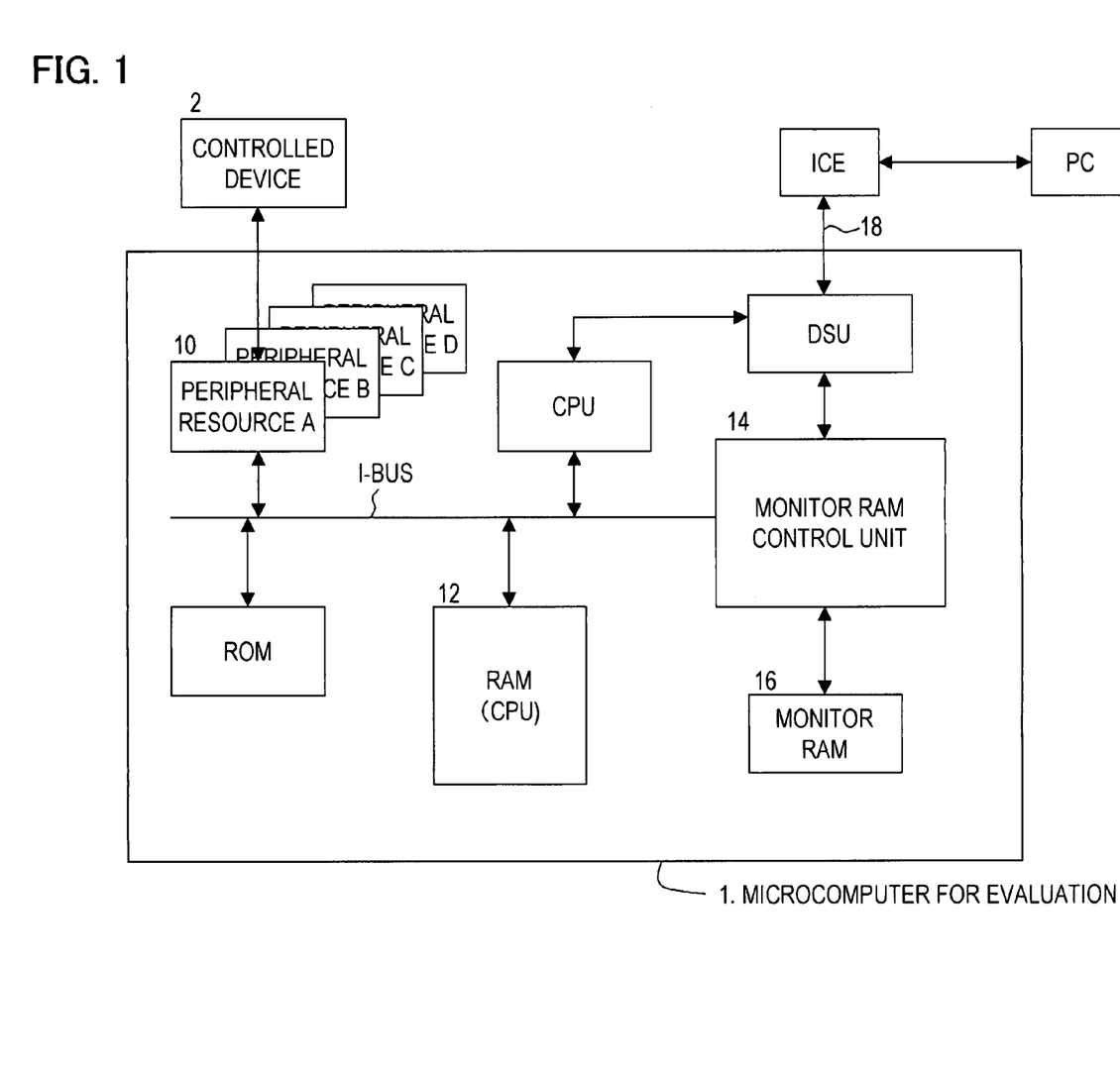
FIG. 1 is a drawing of the configuration of the microcomputer in an aspect of the invention.

FIG. 1 is a drawing of the configuration of the microcomputer in the present embodiment. The microcomputer 1 used for evaluation has ROM in which are stored programs, parameters and other data, RAM 12, in which are stored various data during program execution, a CPU which sequentially executes a program, and a peripheral resource group 10, connected to a controlled device 2 or similar and having prescribed functions; these components are connected via an internal bus I-BUS. The RAM 12 is connected if necessary to the internal bus I-BUS via a RAM interface, not shown. The peripheral resources 10 are macro-circuits which realize various functions, such as for example timer, communication macro, A/D conversion macro for sensor output of a controlled device, and similar. The microcomputer 1 may also be equipped with a direct memory access controller (DMAC), not shown, enabling data transfer between peripheral resources and RAM 12 without passing through the CPU.

The microcomputer 1 is equipped with a debug support unit DSU to perform control such as monitoring internal states, and halting and restarting programs. This DSU is connected to an in-circuit emulator ICE via a serial bus 18, and ICE is connected to a personal computer PC. ICE emulates the microcomputer 1 for the PC. By this means, the PC can be used to monitor the internal state of the microcomputer 1 and to make arbitrary changes to program execution, and so can provide effective support for microcomputer evaluation and program debugging tasks.

The CPU reads a program in ROM via the internal bus I-BUS, and while executing the program writes or reads various data to and from RAM 12 via the internal bus I-BUS. On the other hand, the DSU directly specifies the address for monitoring to the CPU and acquires the specified internal data via the internal bus I-BUS. However, in order to acquire internal data via the internal bus I-BUS, the DSU must acquire bus access rights for the internal bus from the CPU, and in such control it becomes necessary for the CPU to temporarily halt program execution. If the object of control by the microcomputer 1 is for example the fuel injection amount in an automobile engine, halting operation of the microcomputer, even temporarily, entails placing the microcomputer under conditions other than the originally intended control conditions, and so is undesirable. Hence it is desirable that the internal state be monitored from an external device without halting microcomputer operation.

Therefore, the microcomputer 1 of FIG. 1 is provided with monitor RAM 16 and with a control unit 14 to control the monitor RAM. The monitor RAM control unit 14 is connected to the internal bus I-BUS, and executes control such that when the CPU writes data to RAM 12 via the internal bus I-BUS, the data is concurrently written to the monitor RAM 16. Further, the monitor RAM control unit 14 is also connected to the DSU, and is controlled to switch between the above-described concurrent copy mode and monitor mode, through either control or settings from the DSU. When in monitor mode, the monitor RAM control unit 14 executes a control to read data from the monitor RAM 16 in response to access from the DSU.

Figure 2:
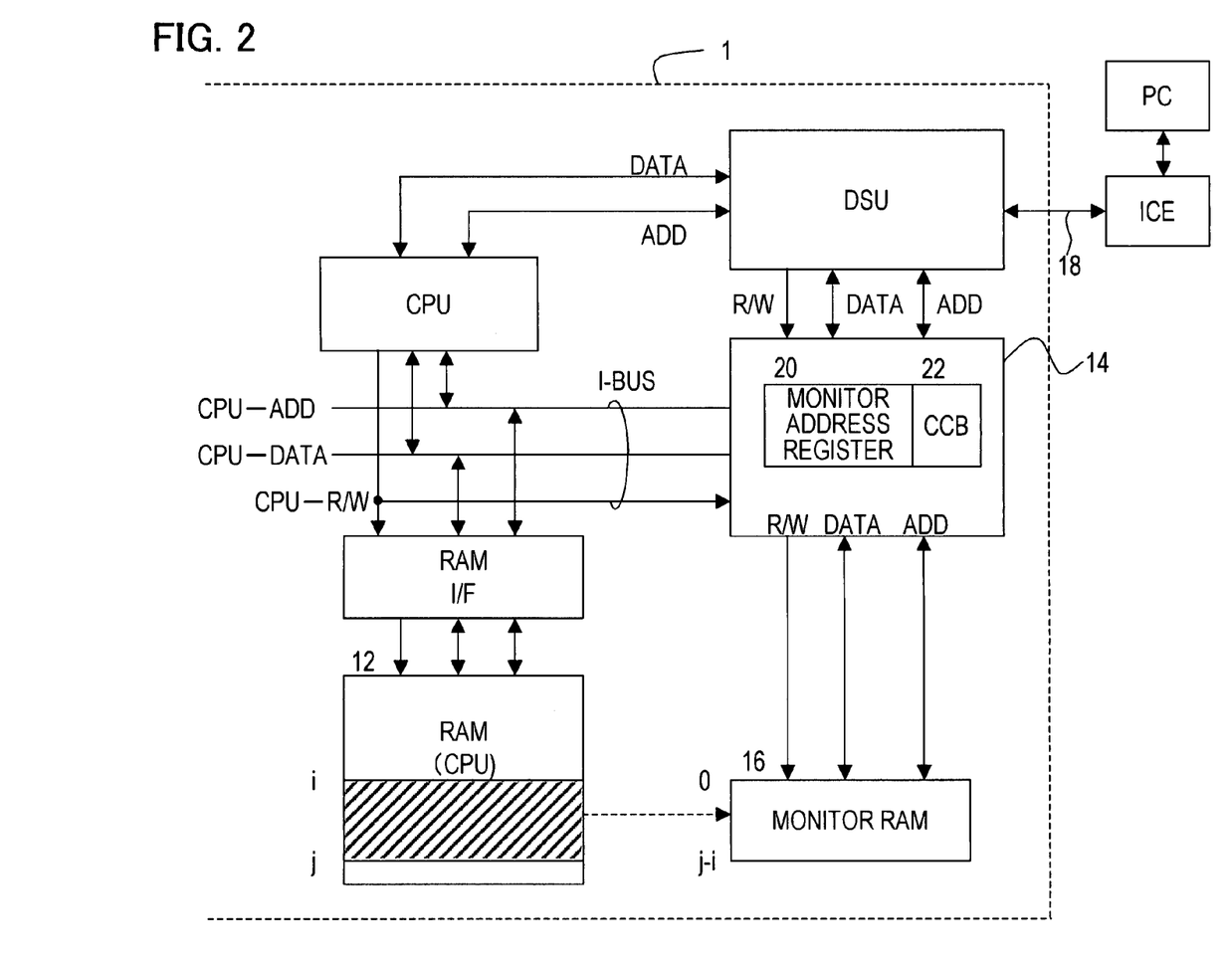
FIG. 2 is a detailed drawing of a portion of the configuration of the microcomputer for evaluation 1 of the aspect.

FIG. 2 is a detailed drawing of a portion of the configuration of the microcomputer for evaluation 1 of the present embodiment. The internal bus I-BUS has, for example, an address bus ADD, a data bus DATA, and a read/write control signal R/W. A RAM interface I/F is provided between the RAM 12 which is the internal memory and the internal bus I-BUS; this RAM interface judges whether access by the CPU is access of the RAM 12, based on whether the address on the address bus ADD corresponds to an address area in the RAM 12, and if the address so corresponds, allows access to the RAM 12.

The monitor RAM control unit 14 has a monitor address register 20 and a concurrent copy bit (CCB) register 22; addresses in the internal RAM 12 for which concurrent writing to the monitor RAM 16 are to be performed are set by the DSU in the monitor address register 20, and the concurrent copy mode and monitor mode are set by the DSU in the concurrent copy bit register 22. In the example of FIG. 2, an address area is set in the monitor address register 20 such that the area of the addresses i and j in internal RAM 12 are concurrently copied to the monitor RAM 16. While the concurrent copy bit register 22 is set to concurrent copy mode, when controlling the write to the internal RAM 12 via the internal bus I-BUS, if the write address coincides with the monitor address i-j, the concurrent writing to the monitor RAM 16 is performed. When the concurrent copy bit register 22 is set to monitor mode, the above-described concurrent writing is forbidden, and reading of data in the monitor RAM 16 is allowed in response to access by the DSU.

In response to a command supplied from the PC via ICE, the DSU sets address to be monitored in the monitor address register 20, and sets the concurrent copy bit register 22 to concurrent copy mode. Then, when the CPU begins program execution, the CPU performs data writing to the internal RAM 12 via the internal bus I-BUS, according to program execution. At this time, if the write address coincides with the monitor address, the same data is concurrently written to the monitor RAM 16 as well. While in this concurrent copy mode, access of the monitor RAM 16 by the DSU is forbidden in order to prevent contention with write operations by the CPU.

When the concurrent copy bit register 22 is set to monitor mode with a certain timing, control is executed such that concurrent writing by the CPU is then forbidden, and access of the monitor RAM 16 by the DSU is enabled. By this means, data in internal RAM 12 can be acquired by the DSU with the above timing, and the PC can monitor the data via the serial bus 18. In this monitoring mode, operation of the CPU is not halted, and the CPU continues to access the internal RAM 12 via the internal bus I-BUS.

The DSU is connected directly to the CPU, and enables, for example, monitoring of data in registers in the CPU and monitoring of data in registers in peripheral resources and of programs or data in ROM. However, when this function is utilized, CPU bus access must be halted temporarily.

Figure 3:
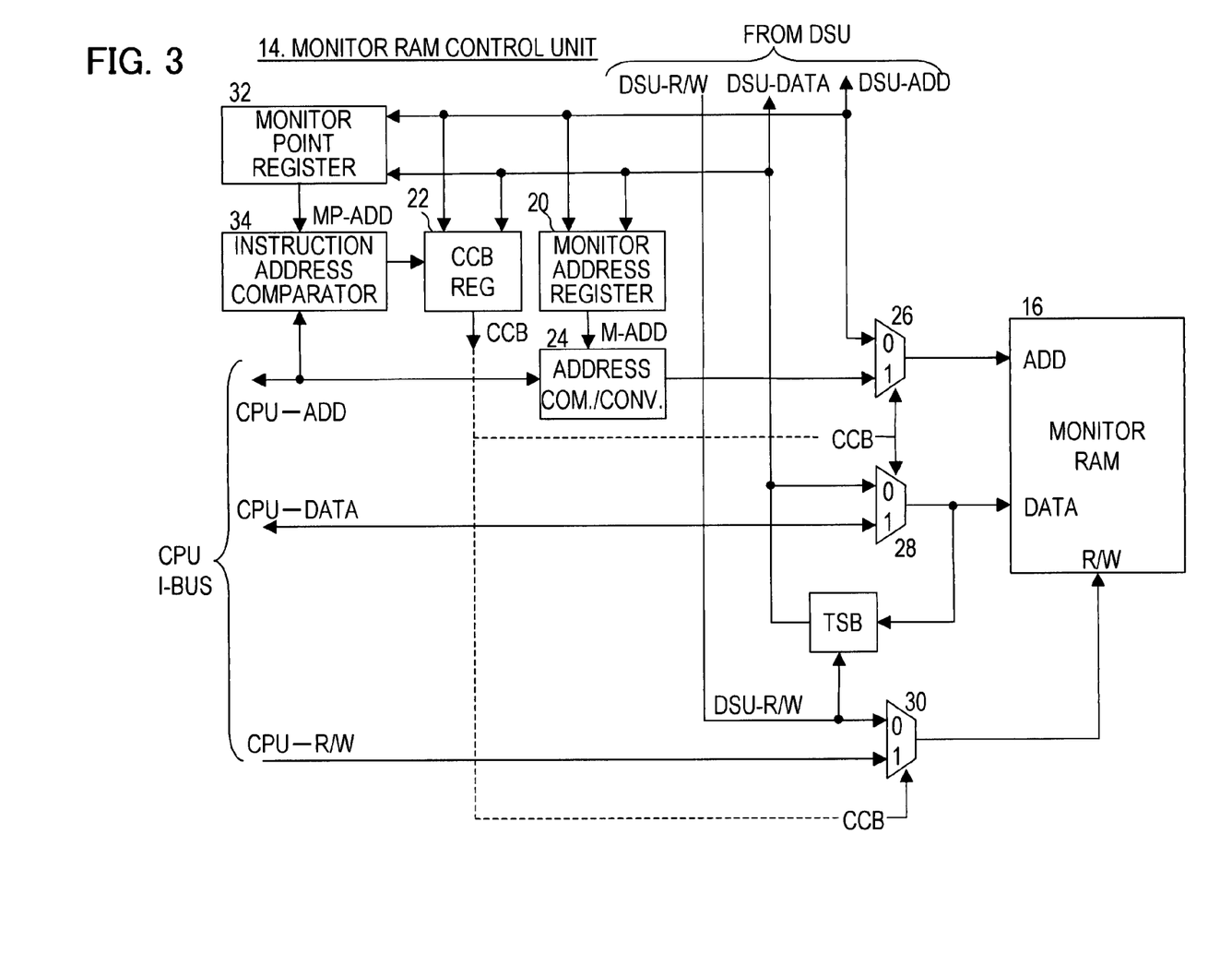
FIG. 3 is a detailed drawing of the configuration of the monitor memory (RAM) control unit in the aspect.

FIG. 3 is a detailed drawing of the configuration of the monitor memory (RAM) control unit in the embodiment. The monitor RAM control unit 14 performs switching between the internal bus I-BUS of the CPU, and the bus from the DSU. For this purpose, the monitor RAM control unit 14 has selectors 26, 28, 30 which perform switching of the address bus ADD, data bus DATA, and read/write signal R/W of the respective buses. Switching of these selectors is performed according to the concurrent copy bit CCB of the concurrent copy bit register 22. That is, the selectors 26, 28, 30 select the internal bus I-BUS connected to the CPU when the concurrent copy bit CCB is in concurrent copy mode, and select the DSU bus when in monitor mode. The bits or flags of the concurrent copy bit register 22 are set by the DSU.

The monitor RAM control unit 14 has a monitor address register 20 which stores addresses for monitoring in the internal RAM 12, and also has an address comparator/converter 24. The address comparator/converter 24 compares an internal bus address CPU-ADD and a monitor address M-ADD, and when there is coincidence, converts the internal bus address CPU-ADD into an address in the monitor RAM 16 and outputs the result.

The monitor RAM control unit 14 has a monitor point register 32 which stores conditions for switching into monitor mode. In the example of FIG. 3, the address MP-ADD of the program at which the concurrent copy mode is converted to the monitor mode is stored in the monitor point register 32. The instruction address comparator 34 compares the instruction address CPU-ADD supplied through the internal bus I-BUS and the monitor point address MP-ADD stored in the monitor point register 32, and if the two coincide, switches the concurrent copy bit register 22 to monitor mode. In addition to the above example, a certain condition for a prescribed data in internal RAM or CPU registers may be set in the monitor point register 32. In this case, judgment means is provided to judge whether the prescribed data satisfies a certain condition, and when the judgment means judges that the condition is satisfied, the judgment means updates the concurrent copy bit register 22 to monitor mode. Or, in another method, the PC may have the DSU change the concurrent copy bit register 22 to monitor mode.

Further, the data input/output terminal DATA of the monitor RAM 16 is connected to the DSU data bus DSU-DATA via the tri-state buffer TSB. In the monitor mode, when the read/write signal from DSU, DSU-R/W, is in the read state, this tri-state buffer TSB acts as a buffer circuit so that output of data read from monitor RAM 16 is enabled. On the other hand, in the monitor mode, when the read/write signal from DSU, DSU-R/W, is in the write state, the tri-state buffer TSB becomes high impedance.

Figure 4:
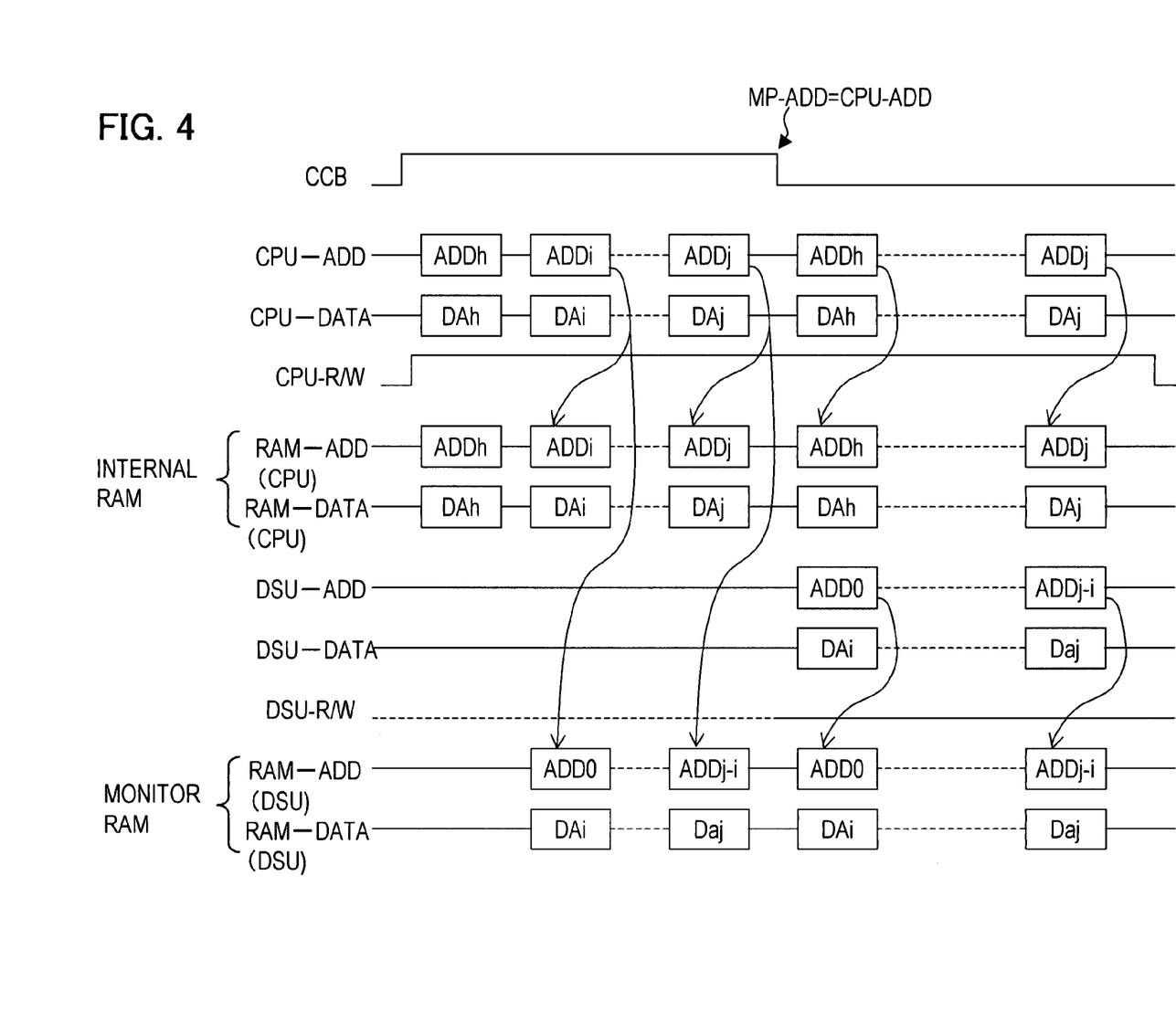
FIG. 4 is a timing chart showing operation in concurrent copy mode and in monitor mode in the aspect.

FIG. 4 is a timing chart showing operation in concurrent copy mode and in monitor mode in this embodiment. First, the DSU sets the concurrent copy bit register 22 to H level to enter concurrent copy mode. Then, while the CPU executes a program, operations to write to internal RAM 12 are executed via the internal bus I-BUS as necessary. When the CPU outputs an address ADDh to the address bus CPU-ADD and data DAh to the data bus CPU-DATA, the data is written to internal RAM 12. However, because the address ADDh does not coincide with the monitor address M-ADD, writing to monitor RAM 16 is not performed. Next, when the CPU outputs an address ADDi to the address bus CPU-ADD, writing to internal RAM 12 is performed, and in addition the address comparator/converter 24 detects that the address ADDi coincides with the monitor address M-ADD of the address register 20, and so the data DAi is concurrently copied to the area of address ADD0 in monitor RAM resulting from conversion from the address ADDi. Similar concurrent copying operations are performed when an address from the CPU CPU-ADD coincides with the monitor address M-ADD. By this means, data written to internal RAM 12 during operation of the CPU is also written concurrently to monitor RAM 16.

When a monitor point address MP-ADD stored in the monitor point register 32 coincides with an address CPU-ADD of the program instruction which the CPU is about to execute, the instruction comparator 34 switches the bit of the concurrent copy bit register 22 to monitor mode. As a result, the monitor RAM control unit 14 forbids access to the monitor RAM 16 by the CPU, and allows access by the DSU. Also, the tri-state buffer TSB is in the buffer state, and the data output from monitor RAM is connected to the DSU data bus DSU-ADD. In the example of FIG. 4, when the address DSU-ADD supplied by the DSU is ADD0 to ADDj-i, the data stored in monitor RAM 16 is output to the DSU. During this period, the CPU accesses the internal RAM 12 as appropriate via the internal bus I-BUS, without halting control operation. That is, the DSU can read internal data written to monitor RAM 16 without halting CPU control operation. Internal data read in this way is output to the PC via ICE.

When the CPU executes an instruction at a monitor point address a plurality of times, if the concurrent copy bit register is set to concurrent copy mode from the PC via the DSU, the data of internal RAM can be monitored no matter how many times the instruction at the monitor point address is executed. For example, when the CPU repeatedly executes the same control, if the repetition interval is comparatively long and there is a margin adequate to enable operations by an operator, the repeated monitoring of data in internal RAM is possible by repeated setting to concurrent copy mode by the DSU.

Figure 5:
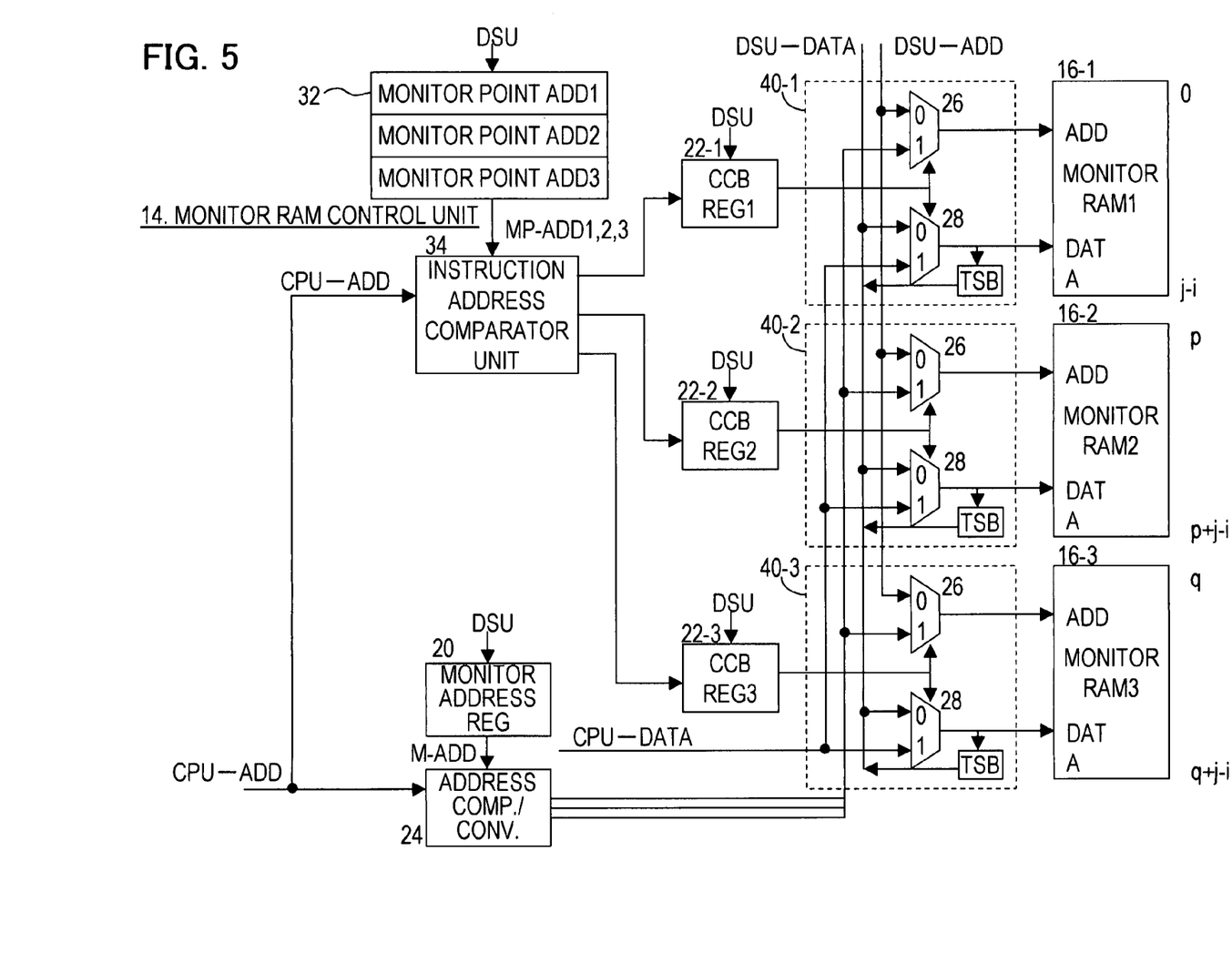
FIG. 5 is a drawing of the configuration of a monitor RAM control unit in a modified example of the aspect; and, FIG. 6 is an operation timing chart for the modified example of FIG. 5.

FIG. 5 is a drawing of the configuration of a monitor RAM control unit in a modified embodiment. In the aspect shown in FIG. 3, only data in internal RAM 12 at a certain monitor point can be monitored from an external device. However, in debugging processes it may be desirable to monitor data in internal RAM 12 at a plurality of monitor points, or to monitor data in internal RAM 12 at times at which a plurality of different conditions are satisfied. In debugging processes, it is desirable that as many monitoring methods as possible be provided.

Hence in the modified embodiment of FIG. 5, data in internal RAM 12 can be monitored at three monitor points. To this end, three monitor RAM units 16-1, 16-2, 16-3 are provided, and switching units 40-1, 40-2, 40-3 to perform switching between the CPU internal bus and DSU bus for each of these monitor RAM units are provided. Each switching unit has selectors 26, 28, 30 (not shown) to perform switching according to the concurrent copy bit CCB, explained in FIG. 3, as well as a tri-state buffer TSB. In the modified embodiment of FIG. 5, three concurrent copy bit registers 22-1, 22-2, 22-3 are provided for the three respective monitor RAM units, to set the corresponding monitor RAM to either concurrent copy mode or to monitor mode. These concurrent copy bit registers 22-1, 22-2, 22-3 are each set from the DSU. Also, three monitor point registers 32 are provided to store monitor point for switching the three monitor RAM units from concurrent copy mode to monitor mode. The addresses 0 to j-i, p to p+j-i, and q to q+j-i are assigned respectively to the three monitor RAM units 16-1, 16-2, 16-3.

Figure 6:
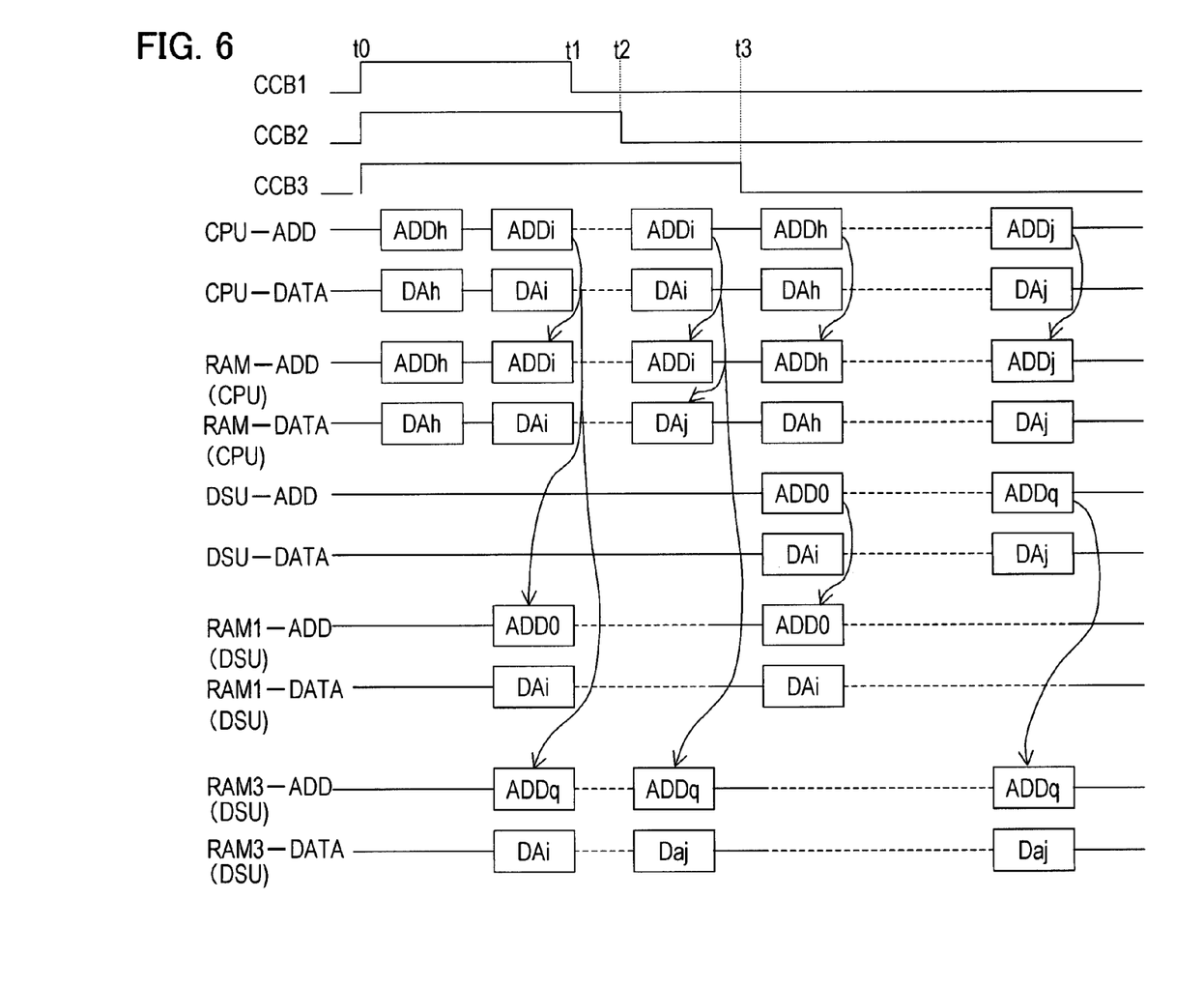

FIG. 6 is an operation timing chart for the modified embodiment of FIG. 5. In the example of FIG. 6, the CPU repeatedly writes data to address ADDi in internal RAM 12, and reads internal data from monitor RAM after the times t1, t2, t3. First, at time t0 the DSU sets all the concurrent copy bit registers 22-1, 22-2, 22-3 to concurrent copy mode. Then, each time the CPU subsequently writes data to internal RAM 12, if the address coincides with a monitor address, the same write data is concurrently written to the three monitor RAM units 16-1, 16-2, 16-3.

At time t1 an instruction address CPU-ADD coincides with a monitor point address MP-ADD1, and the first concurrent copy bit register 22-1 is switched to monitor mode. Together with this, concurrent writing to monitor RAM 16-1 by the CPU is forbidden. That is, at time t1 the data DAi at address ADDi in internal RAM 12 is saved to the first monitor RAM unit 16-1. However, concurrent writing to the second and third monitor RAM units 16-2, 16-3 is continued.

Similarly, at time t2 an instruction address CPU-ADD coincides with the second monitor point address MP-ADD2, and the second concurrent copy bit register 22-2 is switched to monitor mode. Though not shown in FIG. 6, by this means concurrent writing to the second monitor RAM unit 16-2 by the CPU is thereby forbidden, and at time t2 the data in internal RAM 12 is saved to the second monitor RAM unit 16-2. However, concurrent writing to the third monitor RAM unit 16-3 is continued.

Finally, at time t3 an instruction address CPU-ADD coincides with the third monitor point address MP-ADD3, and the third concurrent copy bit register 22-3 is switched to monitor mode. That is, at time t3 the data in internal RAM 12 is saved to the monitor RAM unit 16-3.

After time t3, concurrent writing by the CPU to all monitor RAM units is forbidden, but access to monitor RAM units by the DSU is allowed. By this means, the DSU can specify monitor RAM address and read internal data with a desired timing. In this monitor mode, access to internal RAM 12 by the CPU is allowed, and there is no need to halt CPU operation.

Thus by means of the modified embodiment of FIG. 5 and FIG. 6, data in internal memory at a plurality of timings can be monitored, without halting CPU operation. The timing of monitoring is based on instruction addresses, but as explained above, if the concurrent copy bit register setting is changed when prescribed data in internal memory satisfies prescribed conditions, it is possible to monitor of internal data at times when three types of conditions are satisfied. Further, an implementation is possible in which the concurrent copy bit registers can be changed directly to the monitor mode setting from the DSU. In this case, the PC specifies monitoring points with three different timings, and in response to a command from the PC, the DSU changes the settings of the three concurrent copy bit registers to monitor mode. Hence if a program is set in the PC such that a command to switch to monitor mode is output by the PC when some condition is satisfied, data in internal RAM can be monitored with arbitrary timing, without halting CPU operation.

As explained above, according to the embodiment, when in concurrent copy mode, writing is also performed to monitor RAM when the CPU writes data to internal RAM, and when in monitor mode, concurrent writing to monitor RAM by the CPU is forbidden, and access by the DSU is allowed. By this means, data in internal RAM can be monitored without halting CPU operation, so that the convenience of debugging processes can be improved.

What is claimed is:

1. A microcomputer comprising:
   a CPU which sequentially executes a program;
   an internal memory connected to said CPU via an internal bus;
   a debug support unit, which monitors an internal state in response to an externally provided command;
   a monitor memory, which stores data stored in said internal memory, for being accessed by said debug support unit; and
   a monitor memory control unit, connected to said internal bus, which at a concurrent copy mode performs a control to connect the internal bus to the monitor memory and concurrently write, to said monitor memory, data which is written to said internal memory in response to an access from said CPU, and which at a monitor mode performs a control to connect the debug support unit to the monitor memory,
   wherein at the monitor mode, said CPU continues to access the internal memory via the internal bus, while the monitor memory control unit performs a control to read data in said monitor memory and transfers the read data to said debug support unit.

2. The microcomputer according to claim 1, wherein said monitor memory control unit has a monitor address register in which is set an address in said internal memory for the data for said concurrent writing, said monitor memory control unit performs control so as to write data supplied to said internal bus to said monitor memory when an address supplied to the internal bus coincides with the address set in said monitor address register, and the address in said monitor address register is set by said debug support unit.

3. The microcomputer according to claim 1, wherein said monitor memory control unit has a concurrent copy flag register in which is stored a concurrent copy flag for distinguishing said concurrent copy mode and said monitor mode, and performs a control of said concurrent copy mode or said monitor mode according to the concurrent copy flag, and the value in said concurrent copy flag register is set by said debug support unit.

4. The microcomputer according to claim 1, wherein said monitor memory control unit forbids access from said debug support unit when in said concurrent copy mode, and forbids access from said internal bus when in said monitor mode.

5. The microcomputer according to claim 1, wherein said monitor memory control unit has a mode switching setting register which sets a condition for switching from said concurrent copy mode to said monitor mode, and when the condition set in the mode switching setting register is satisfied, switches from said concurrent copy mode to said monitor mode, and wherein the value in said mode switching setting register is set by said debug support unit.

6. The microcomputer according to claim 5, wherein a prescribed program address is set in said mode switching setting register, and when a program address supplied to said internal bus coincides with the program address set in the mode switching setting register, said monitor memory control unit switches from said concurrent copy mode to said monitor mode.

7. The microcomputer according to claim 1, wherein said monitor memory has first and second monitor memory areas, said monitor memory control unit controls switching to said concurrent copy mode and to said monitor mode for each of said first and second monitor memory areas, and said monitor memory control unit performs a control so as to concurrently write data written to said internal memory to said first and second monitor memory areas when the first and second monitor memory areas are both in concurrent copy mode, performs control so as to halt concurrent writing to said first monitor memory area and so as to perform concurrent writing to said second monitor memory area when said first monitor memory area is in monitor mode and said second monitor memory area is in concurrent copy mode, and performs a control so as to halt concurrent writing to said first and second monitor memory areas when said first and second monitor memory areas are both in monitor mode.

8. The microcomputer according to claim 7, wherein said monitor memory control unit has first and second mode switching setting registers in which are set conditions for switching from said concurrent copy mode to said monitor mode, said first monitor memory area is switched from said concurrent copy mode to said monitor mode when the condition set in said first mode switching setting register is satisfied, said second monitor memory area is switched from said concurrent copy mode to said monitor mode when the condition set in said second mode switching setting register is satisfied, and values in said first and second mode switching setting registers are set by said debug support unit.

9. The microcomputer according to claim 8, wherein prescribed first and second program addresses are set in said first and second mode switching setting registers, and said monitor memory control unit switches said first monitor memory area from said concurrent copy mode to said monitor mode when a program address supplied to said internal bus coincides with the first program address set in the first mode switching setting register, and switches said second monitor memory area from said concurrent copy mode to said monitor mode when a program address supplied to said internal bus coincides with the second program address set in the second mode switching setting register.

10. A microcomputer comprising:
a CPU which sequentially executes a program;
an internal memory connected to said CPU via an internal bus;
a debug support unit, which monitors the internal state in response to an externally provided command;
a first and second monitor memories, which store data stored in said internal memory, for being read from said debug support unit; and
a monitor memory control unit, connected to said internal bus, which performs a control to forbid an access from said CPU to the first monitor memory, connect the debug support unit to the first monitor memory, connect the internal bus to the second monitor memory, and concurrently write, to said second monitor memory, data which is written to said internal memory in response to access from said CPU,
wherein said CPU continues to access the internal memory via the internal bus, while the monitor memory control unit performs a control to read data in said first monitor memory in response to access from said debug support unit, and the data read from said first monitor memory is output to an external device via said debug support unit.

11. The microcomputer according to claim 10, wherein said monitor memory control unit has a monitor address register in which is set an address in said internal memory for the data for said concurrent writing, said monitor memory control unit performs control so as to write data supplied to said internal bus to said second monitor memory when an address supplied to the internal bus coincides with the address set in said monitor address register, and the address in said monitor address register is set by said debug support unit.

* * * * *